United States Patent [19]

Crivellin

[11] Patent Number: 5,197,836
[45] Date of Patent: Mar. 30, 1993

[54] MACHINE TOOL SPINDLEHEAD WITH THREE DEGREES OF FREEDOM

[75] Inventor: Lorenzo Crivellin, Borgaro Torinese, Italy

[73] Assignee: Vigel S.p.A., Borgaro Torinese, Italy

[21] Appl. No.: 792,825

[22] Filed: Nov. 15, 1991

[30] Foreign Application Priority Data

Nov. 23, 1990 [IT] Italy ................... 67922 A/90

[51] Int. Cl.⁵ .................................. B23C 1/02
[52] U.S. Cl. ........................................ 409/200
[58] Field of Search ............ 409/200, 216, 143, 231; 82/1, 2

[56] References Cited

U.S. PATENT DOCUMENTS

| | | | |
|---|---|---|---|
| 4,125,057 | 11/1978 | Cox | 409/143 X |
| 4,423,991 | 1/1984 | Derr et al. | 409/200 |
| 4,602,539 | 7/1986 | Tsukiji | 82/1.2 |
| 4,789,278 | 12/1988 | Dexter et al. | 409/200 |
| 4,934,040 | 6/1990 | Turchan | 29/566 |

FOREIGN PATENT DOCUMENTS

| | | | |
|---|---|---|---|
| 3919359 | 2/1990 | Fed. Rep. of Germany . | |
| 510326 | 6/1976 | U.S.S.R. | 409/200 |
| 556898 | 5/1977 | U.S.S.R. | 409/200 |
| 891260 | 12/1981 | U.S.S.R. | 409/200 |
| 1543270 | 3/1979 | United Kingdom . | |

*Primary Examiner*—William Briggs
*Attorney, Agent, or Firm*—Guido Modiano; Albert Josif

[57] ABSTRACT

The machine includes a first central support, which is rotatably supported by the frame of the spindlehead, and a second planetary support, which eccentrically supports the spindle and is rotatably and eccentrically supported by the central support; the first and second supports are suitable for producing, by virtue of the combination of their mutual rotary motions, movements of the spindle in two mutually perpendicular directions; the spindlehead is in turn supported by a slider with the possibility of moving along a third direction which is perpendicular to the first two.

5 Claims, 3 Drawing Sheets

MACHINE TOOL SPINDLEHEAD WITH THREE DEGREES OF FREEDOM

BACKGROUND OF THE INVENTION

The present invention relates to a chip-forming machine tool provided with a spindlehead having three degrees of freedom, this expression indicating the fact that the spindle can move in space along a set of three Cartesian axes.

More precisely, the invention relates to machine tools in which the rotation axis of the spindle is parallel to an axis of the Cartesian set of three axes, for example the "z" axis, and in which said spindle can move, while maintaining its own rotation axis parallel to the "z" axis, in the direction of two further perpendicular axes "x" and "y" as well as along the direction of said "z" axis.

As known, current machine tools with three degrees of freedom use, for the movement of the spindlehead, a set of three mutually perpendicular sliders which are respectively parallel to the set of three reference axes; said sliders are mutually rigidly associated and can slide with respect to one another.

This known and widespread movement system has several disadvantages, which mostly include its overall bulk, the difficulty in achieving a high degree of precision (since the plays of the various cascade couplings add to one another), and the complexity of the mechanisms for the straight-line movement of the sliders.

SUMMARY OF THE INVENTION

The aim of the present invention is to eliminate these disadvantages, and within the scope of this general aim, an important object of the invention is to provide a machine tool with a spindlehead having three degrees of freedom which, for an equal range of movements of the spindle, has a modest bulk which is reduced by approximately 40% with respect to known arrangements with perpendicular sliders.

Another important object of the present invention is to provide a machine tool with a spindlehead having three degrees of freedom which is suitable for allowing a high degree of precision in the movements of the spindle.

A further important object of the present invention is to provide a machine tool with a spindlehead having three degrees of freedom which is suitable for allowing a considerable simplification of the mechanisms for the movement of the spindle parallel to the set of three reference axes.

A further object of the invention is to improve the overall structure of machine tools of the specified type by making it more compact, less sensitive to the state of wear and maintenance of the contact surfaces, and more suitable for automated management by means of known numeric-control systems.

This aim, these important objects and others which will become apparent from the following detailed description, are achieved by a chip-forming machine tool with at least one spindlehead having three degrees of freedom, according to the present invention, characterized in that said spindlehead comprises a first central support which is rotatably supported by a rigid frame of said spindlehead, and a second planetary support, which eccentrically supports the spindle and is rotatably and eccentrically supported by the central support; said first and second supports being suitable for producing, by virtue of the combination of their mutual rotary motions, movements of said spindle in two mutually perpendicular directions; said spindlehead being in turn supported by a slider with the possibility of moving along a third direction which is perpendicular to the first two.

According to the invention, therefore, the movements of the spindle along two of the reference axes are defined by the polar coordinates of the central support with respect to the spindlehead and by the polar coordinates of the planetary support with respect to the central one, and for this purpose the planetary circular path passes through the center of rotation of the central support; the term "planetary" is used to indicate the path followed by a point of the axis of the spindle by virtue of the rotation of the planetary support alone.

Accordingly, the maximum stroke of the spindle along said two perpendicular axes is equal to twice the diameter of the planetary circular path, and said diameter is in turn equal to the radius of the maximum central circular path; the term "central" is used to indicate the path followed by a point of the axis of the spindle by virtue of the rotation of the central support alone.

BRIEF DESCRIPTION OF THE DRAWINGS

Further characteristics and advantages of the present invention will become apparent from the following detailed description thereof, with reference to the accompanying drawings, given by way of non-limitative example, wherein.

DESCRIPTION OF THE PREFERRED EMBODIMENTS

Figure 1:
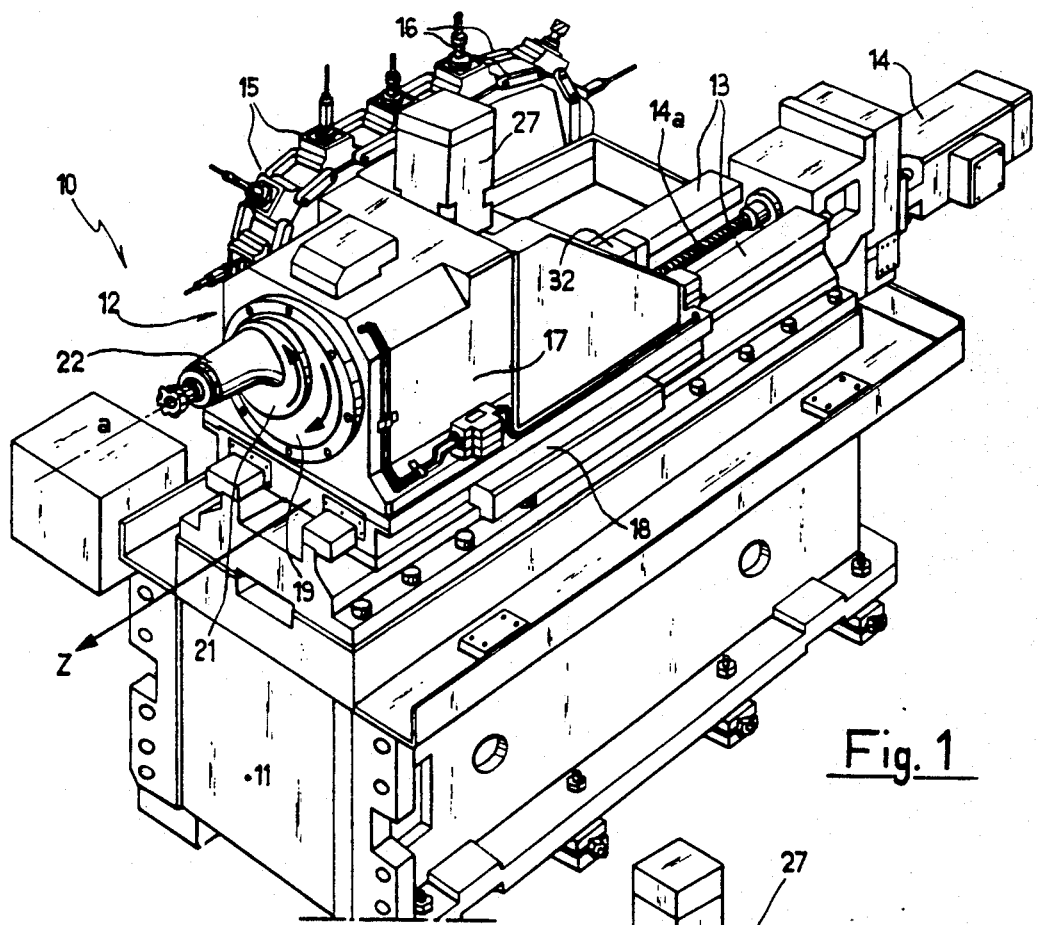
FIG. 1 is a perspective view of the machine according to the present invention.

In the drawings, the reference numeral 10 generally indicates the machine tool, which comprises a supporting table 11 and a spindlehead 12 which is supported so as to be slidable on guides 13 of the table which define a spindle movement direction, for example direction "z", of a set of three perpendicular reference axes "x", "y" and "z". A positioning motor 14 and an actuation screw 14a associated with the motor move the head 12 along the guides 13 in a known manner.

Laterally with respect to the head 12, the table is provided with a tool magazine which is composed of a plurality of supports 15 for tools connected by links of chains 16 which cooperate with traction sprockets driven by a motor which is not illustrated in the figure.

The spindlehead 12 comprises a rigid frame 17, which is supported by a slider 18 which can slide along the guides 13 of the table, a first central cylindrical support 19, which is rotatably supported by the frame 17 by means of bearings 20, and a second planetary cylindrical support 21, which bears the spindle 22 and is rotatably supported by the central support 19 by means of bearings 23.

As clearly shown in the figures, the spindle 22 is arranged eccentrically on the planetary support, and its rotation axis "a" is offset by an amount R1 with respect to the rotation axis "b" of the support 21. Therefore, when the planetary support 21 rotates with respect to the central support 19, a generic point of the axis "a" of the spindle defines a planetary circular path "t" which has a radius R1 and is centered on the rotation axis "b" of the planetary support 21. Similarly, the planetary support 21 is eccentrically supported by the central support 19, and the rotation axis "b" of the support 21 is axially offset by an amount R1 with respect to the axis of rotation "c" of the central support 19. Accordingly, the planetary path "t" of the spindle passes through the rotation axis of the central support 19, and the maximum stroke of the spindle, along two perpendicular axes "x" and "y" the origin of which lies on the axis "c", is equal to twice the diameter of the planetary path "t", said diameter being in turn equal to the radius R2 of the maximum central circular path T, i.e. of the maximum path traced by a point of the axis of the spindle by virtue of the rotation of the support 19.

Figure 2:
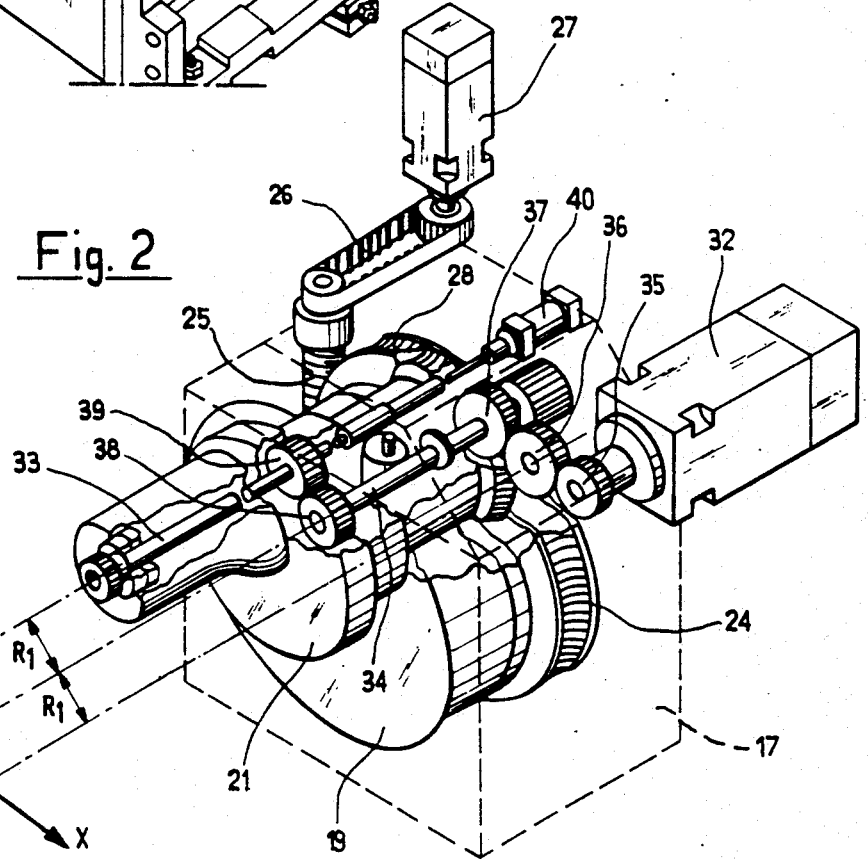
FIG. 2 is a schematic perspective view of a detail of kinematic systems of the spindlehead.

A peripheral helical gear 24 is provided on the central support 19, and a worm screw 25 meshes therewith; said worm screw is actuated, by means of a transmission provided with a toothed belt 26, by a central positioning -motor 27 (FIG. 2).

Figure 3:
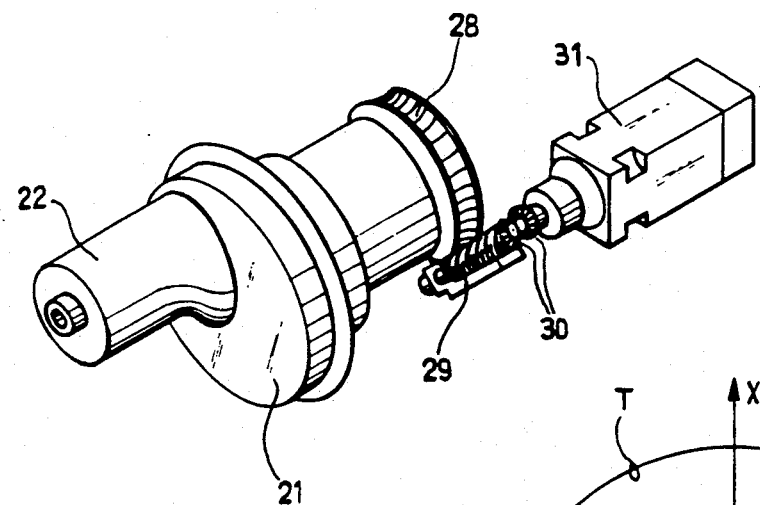
FIG. 3 is a similar perspective view of another detail of the spindlehead.

Similarly, a peripheral helical gear 28 is provided on the planetary support 21 (FIG. 3), and a worm screw 29 meshes therewith; said worm screw is actuated by a planetary positioning motor 31, with an interposed bevel gear transmission 30. The adoption of screw/gear pairs is advantageous in terms of the non-reversibility of the motion and of the consequent stability of the positions of the spindle even when the stress of the tool discharges thereon.

A third actuation motor 32 provides the working rotation of the shaft 33 of the spindle by means of a transmission shaft 34 which is coaxial to the support 21 and is actuated by a set of three transmission gears 35-36-37 which connect the motor 32 to the shaft 34 and by a further pair of transmission gears 38-39 which connect the transmission shaft 34 to the spindle shaft 33. A fluidactuated cylinder 40 is arranged on the spindle shaft 33 to open and close the jaws of the spindle in a per se known manner.

From the above description it is evident that the movements of the spindle 22 along the reference axes "x" and "y" are defined by the polar coordinate o of the central support 19 with respect to the frame 17 of the head and by the polar coordinate $\beta$ of the planetary support 21 with respect to the central support 19; the spindle can position itself in any point of the circular area having radius R2=2R1.

Angular sensor means (not illustrated), for example known encoders, are provided in order to detect the angular position of the supports and provide corresponding positioning data to a microprocessor which provides the numeric control of the machine in a per se known manner.

Figure 5:
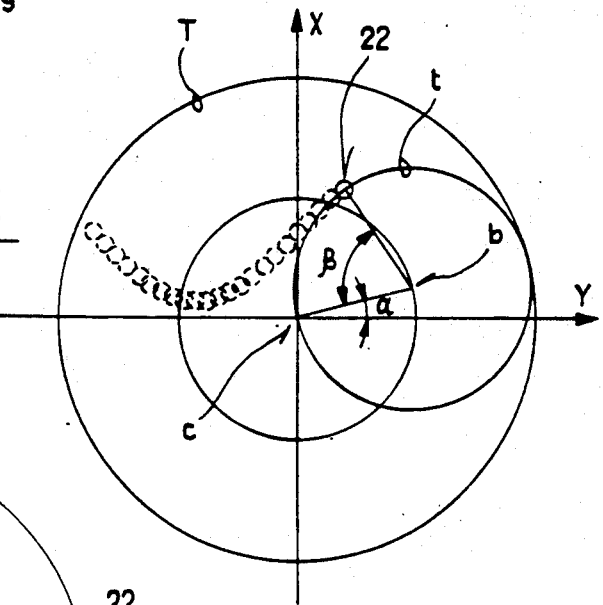
FIG. 5 is a plot of the polar coordinates of a generic point of the axis of the spindle.
Figure 6:
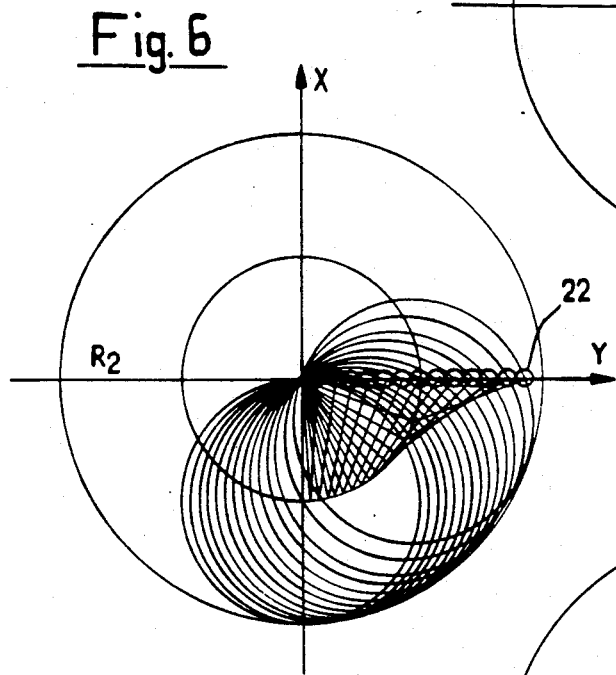
FIGS. 6 and 7 are plots of the configurations of the system for movements of said point of the axis of the spindle along two perpendicular axes "x" and "y" respectively.
Figure 7:
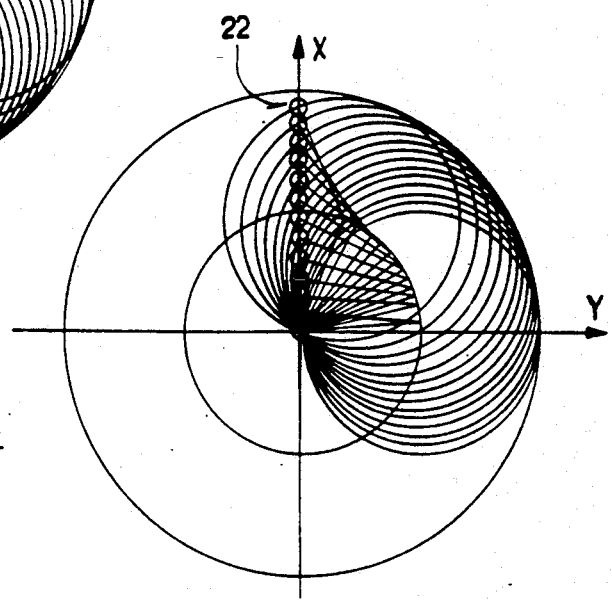
Figure 4:
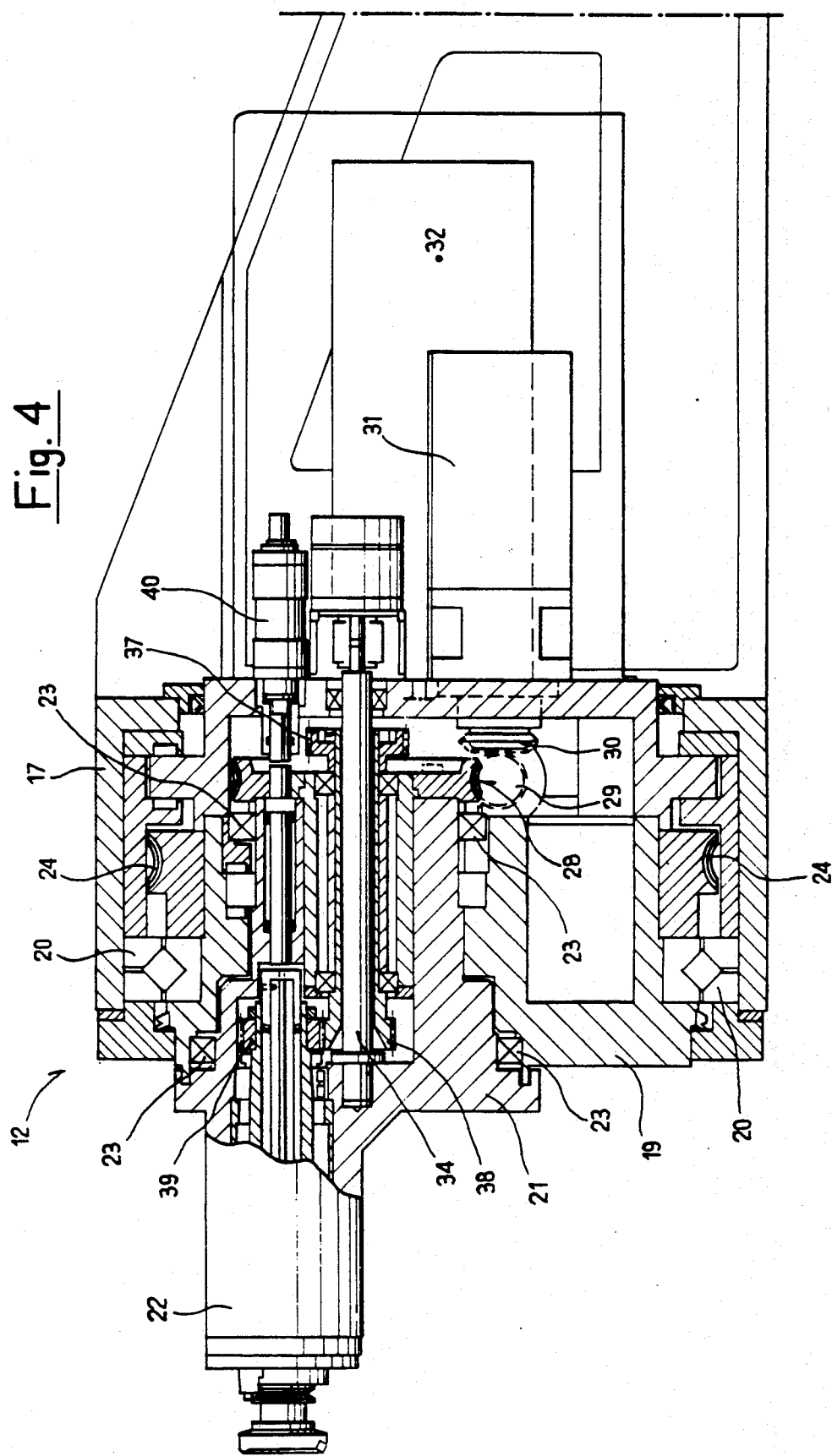
FIG. 4 is a partial axial longitudinal sectional view of the spindlehead.

The plot of FIG. 5, which is immediately understandable, shows the configurations of the system for movements of the spindle along the "x" axis, and the plot of FIG. 6 shows the similar configurations of the system for movements along the "y" axis.

Preferably, according to the invention, the central support 19 and the planetary one 21 counter-rotate.

Naturally, without varying the concept of the invention, the details of execution and the embodiments may be extensively varied with respect to what has been described by way of non-limitative example without thereby abandoning the scope of the invention.

I claim:

1. A chip-forming machine tool with at least one spindlehead having three degrees of freedom, comprising:

a rigid frame and means for sliding said rigid frame along a first direction;

a first central support rotatably supported by said rigid frame about a first axis parallel to said first direction;

means for rotating said first central support about said first axis;

a second planetary support eccentrically rotatably supported by said first central support about a second axis parallel to said first direction;

means for rotating said second planetary support about said second axis;

a spindle for carrying a tool and eccentrically rotatably supported by said second planetary support about a third axis parallel to said first direction; and means for rotating said spindle about said third axis; said means for rotating the first central support comprising a first helical gear provided peripherally on said first central support and a first worm screw meshing with said first helical gear and driven by a first positioning motor, said means for rotating the second planetary support comprising a second helical gear provided peripherally on said second planetary support and a second worm screw meshing with said second helical gear and driven by a second positioning motor, said second positioning motor being a planetary positioning motor supported by said first central support and moving in rotation therewith.

2. The machine tool of claim 1, wherein the distance between said first axis and said second axis is equal to the distance between said second axis and said third axis.

3. The machine tool of claim 1, wherein said first central support is cylindrical and is supported by said rigid frame with roller bearings interposed therebetween.

4. The machine tool of claim 1, wherein said second planetary support is cylindrical and is supported by said central support with roller bearings interposed therebetween.

5. The machine tool of claim 1, wherein said means for rotating said spindle comprise a transmission shaft arranged coaxially to said second axis, an actuation motor, and gears interposed between said transmission shaft, said motor and said spindle.

* * * * *